United States Patent [19]

Rebholz et al.

[11] 4,436,370
[45] Mar. 13, 1984

[54] SPACE VARIANT LINEAR PHASE SHIFTER FOR OPTICAL AMBIGUITY FUNCTION GENERATOR

[75] Inventors: Joseph J. Rebholz, Burnsville; Poohsan N. Tamura, Bloomington, both of Minn.

[73] Assignee: Honeywell Inc., Minneapolis, Minn.

[21] Appl. No.: 232,927

[22] Filed: Feb. 9, 1981

[51] Int. Cl.³ .................. G06G 9/00; G01S 13/58
[52] U.S. Cl. .................. 350/162.12; 343/9 PS; 364/822
[58] Field of Search .......... 350/162.12; 364/822, 364/827; 343/9 PS

[56] References Cited

U.S. PATENT DOCUMENTS

| | | | |
|---|---|---|---|
| 4,286,328 | 8/1981 | Bocher | 364/822 |
| 4,310,894 | 1/1982 | Lee et al. | 350/822 |
| 4,389,092 | 6/1983 | Tamura | 350/162.12 |

OTHER PUBLICATIONS

Poohsan N. Tamura, application Ser. No. 173,319, filed Jul. 29, 1980, allowed Nov. 24, 1982.

Primary Examiner—Bruce Y. Arnold
Assistant Examiner—William Propp
Attorney, Agent, or Firm—Omund R. Dahle

[57] ABSTRACT

This invention provides a simple and easily manufacturable lens apparatus, a space variant phase shifter, which is one of the key components in an optical ambiguity function generator. The improved lens apparatus is a combination of conventional optics comprising a cylindrical lens and a spherical lens in which the spherical lens is of opposite sign than the cylindrical lens and of one half the power.

3 Claims, 3 Drawing Figures

SPACE VARIANT LINEAR PHASE SHIFTER FOR OPTICAL AMBIGUITY FUNCTION GENERATOR

BACKGROUND AND SUMMARY OF THE INVENTION

The Government has rights in this invention pursuant to a contract awarded by the Department of the Navy.

This invention provides a simple and manufacturable lens apparatus (space variant phase shifter), the key component in the optical ambiguity function generator.

Under many circumstances an acoustic or electromagnetic signal is received from a moving source and information as to the location and velocity of the source is desirable. Examples of where this occurs are undersea surveillance and radar surveillance. A common method of representing this is on a graph known as an ambiguity plane, where distance is plotted against velocity as revealed by the relative doppler shift between two signals. The relative time shift and doppler shift between two signals so received can be used to construct this graph.

One-dimensional spatial light modulators are employed to code the signals into a beam of substantially coherent light. After the light has been coded with the first one-dimensional signal a Fourier Transform is performed by lens means. A linear phase shifter is placed in the Fourier Transform plane. This has the effect of creating a linear dependence along a second dimension when a second Fourier Transform is performed.

In my earlier patent application Ser. No. 173,319, filed July 29, 1980 now U.S. Pat. No. 4,389,092, assigned to the same assignee as the present application, and entitled "High Speed Ambiguity Function Evaluation by Optical Processing Utilizing a Space Variant Linear Phase Shifter", which application is incorporated herein by reference, there is taught that the ambiguity plane is prepared by evaluating the ambiguity integral which is defined as $$\chi(\nu,\tau) = \int f_1(t) f_2^*(t-\tau) e^{-i2\pi\nu t} dt \tag{1}$$

In this equation $f_1(t)$ and $f_2(t)$ are the two signals being compared expressed as functions of time. The variable $\tau$ is introduced to correct for the fact that although it is expected that $f_1(t)$ and $f_2(t)$ should have a similar form, they will, in general, be shifted in time relative to each other. The function $f_2^*(t-\tau)$ is the complex conjugate of $f_2(t-\tau)$ which is the time shifted version of the signal actually received. The factor $e^{-i2\pi\nu t}$ is introduced to correct for the frequency difference between $f_1(t)$ and $f_2(t)$, caused by the doppler effect. The values of $\nu$ and $\tau$ which yields a maximum value of the ambiguity integral may be used to extract information about the velocity and range of the objects under surveillance.

In order to be useful for surveillance purposes the information displayed on an ambiguity surface must be as current as possible. For this reason evaluation of the integral (1) must be performed in real time. The ability of optical analog processing to process multiple channels of data rapidly in a parallel fashion has led to its acceptance as a method for ambiguity function calculations. A common procedure involves the preparation of data masks for $f_1(t)$ and $f_2^*(t-\tau)$ with t on the horizontal axis and $\tau$ on the vertical. Optical data processing means perform the multiplication and integration in equation (1) leaving a $\nu$ dependence on the horizontal axis and a $\tau$ dependence on the vertical. The graph thus produced is then searched for its greatest value, which is the maximum of the ambiguity integral.

In this earlier application above referred to it is shown that a linear phase shift approach can create the two dimensional field from one dimensional input transducers with a shearing process performed by a linear phase shifter.

This shear concept is depicted in FIG. 1. The telecentric spherical lens pair 36 and 39 forms the image of Bragg cell I and $f_2(t)$ onto Bragg cell II and $f_1(t)$ through a linear phase shifter in the Fourier plane. The presence of the linear phase shifter causes a position shift of the image, and this misregistration accomplishes the $\tau$-shift. By spatially varying the slope of the linear phase shifter along the vertical direction, the system spatially scans continuously in the $\tau$ axis. Lens 41 performs a spatial integration to yield the desired ambiguity function. It is possible to think of this process as a stretching of the positive end of the $\tau$ axis in one direction and the negative end of the $\tau$ axis in the opposite direction while the center is held stationary. It can be seen that the linear phase shifter is inserted in the first Fourier transform plane. The mathematical Fourier analysis is provided in my earlier application.

One factor in the feasibility of implementing the linear phase shifter approach depends on the producability of the linear phase shifter element. It is essentially an optical wedge whose wedge angle linearly changes with height. Conventional manufacturing processes such as grinding and polishing a glass element is difficult. In the present invention this linear phase shifter optical element is fabricated from conventional optics as will be described in more detail below.

BRIEF DESCRIPTION OF THE DRAWING

FIG. 1 is a pictorial view of a linear phase shifter optical layout for ambiguity function generation using Bragg cells according to my earlier application, herein referred to.

DETAILED DESCRIPTION

The Prior Art

Figure 2:
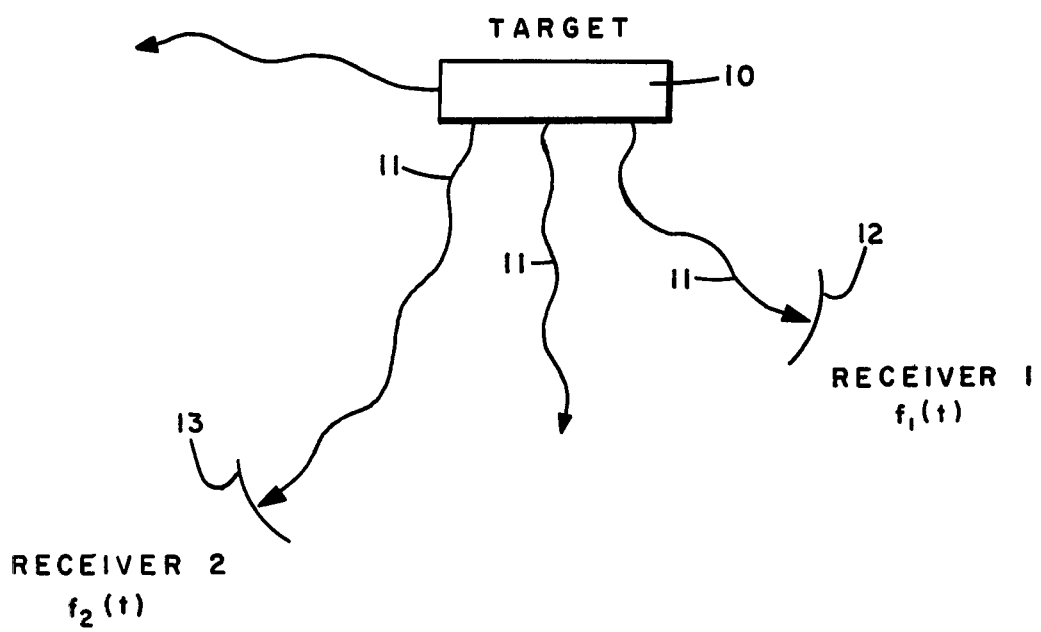
FIG. 2 is a basic scenario in which ambiguity processing is useful and FIG. 3 is the improved optics.

FIG. 2 shows a typical situation where ambiguity processing is used. A target 10 emits a signal, represented by arrows 11, in all directions. The signal is received by a first receiver 12 and a second receiver 13. It is clear that if the target is moving there will be a different doppler shift observed by the two receivers 12 and 13. If the receivers 12 and 13 are different distances from the target 10 the signals 11 will also arrive at different times. Therefore the signal observed by receiver 12 is of the form $$f_1(t) = \mu(t) e^{i\omega_1 t} \tag{2}$$

and the signal $f_2(t)$ observed by receiver 13 is of the form $$f_2(t)\, \nu(t+)\, t_o)\, e^{i\omega_2(t+t_o)} \tag{3}$$

In these expressions $\nu(t)$ may be regarded as a function modulating a carrier wave. In equation (3) $t_o$ is a constant which expresses the difference of propagation time for the signal received by the first receiver 12 and the second receiver 13. In general $t_o$ may be positive, negative or zero. If $t_o$ is positive, the signal arrives at receiver 12 before it arrives at receiver 13. If $t_o$ is negative the signal arrives at receiver 13 first. If $t_o$ is zero both receivers 12 and 13 receive the signal at the same time. The terms $e^{i\omega_1 t}$ and $e^{i\omega_2(t+t_o)}$ are carrier waves of angular frequency $\omega_1$ and $\omega_2$ respectively. The difference between $\omega_1$ and $\omega_2$ is the relative doppler shift. It is clear that the ambiguity function of equation (1) will take on a maximum value when $$2\pi v = \omega_1 - \omega_2 \text{ and } \tau = -t_o \tag{4}$$

Figure 1:
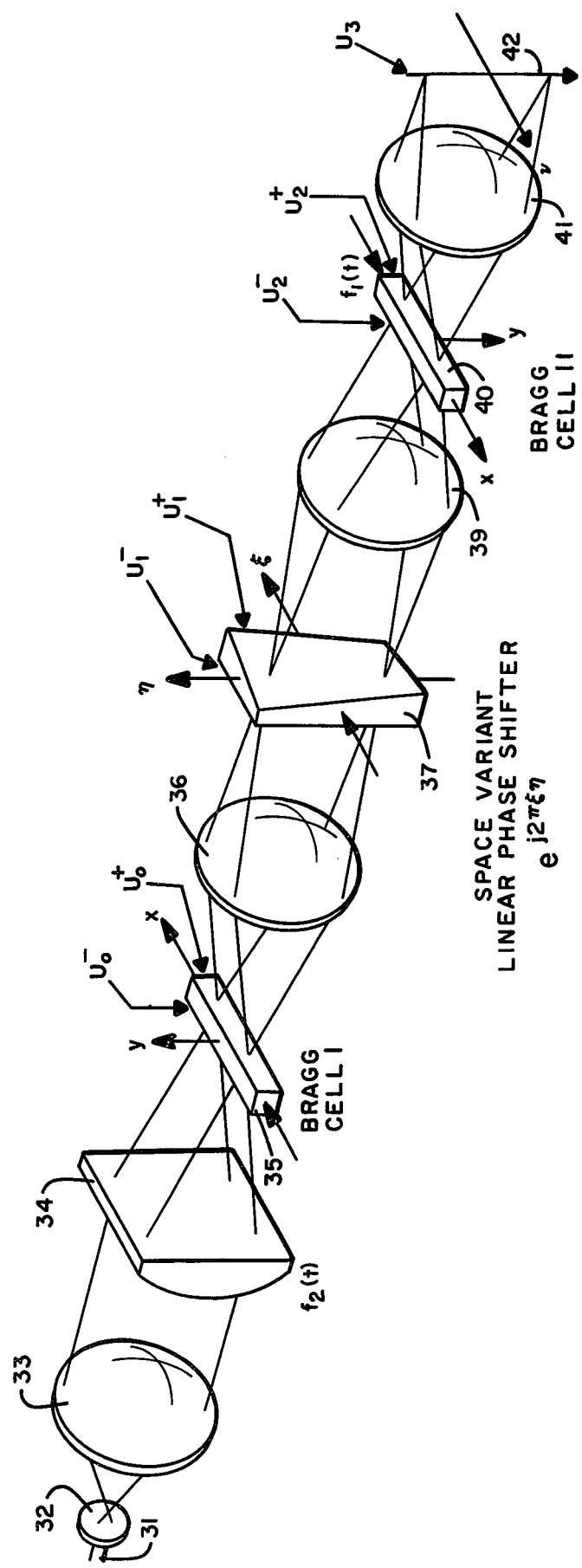

FIG. 1 shows the preferred embodiment of my earlier application, above referred to, using a linear phase shifter of the transmission type. A coherent source such as laser emits a light beam 31, which is expanded and recollimated by microscope objective 32 and spherical lens 33. The light beam 31 then strikes cylindrical lens 34, which focuses the beam into a line lying within the one-dimensional SLM (spatial light modulator) 35. The signal $f_2(t)$ or $f_2^*(t)$ is applied to one-dimensional SLM 35, with the x axis of one-dimensional SLM 35 corresponding to the t variable. If the signal used is $f_2(t)$ the complex conjugate must be obtained by a spatial filtering process.

The light passing through one-dimensional SLM 35 is coded with the applied function and then expands until it impinges upon spherical Fourier Transform lens 36. Spherical lens 36 Fourier transforms the signal coded into the light beam by one-dimensional SLM 35. The Fourier transformed image appears at the location of the linear phase shifter of the transmission type 37. It is the linear phase shifter which performs the shearing function of the applied image.

Light beam 31 expands once more until it strikes spherical Fourier Transform lens 39. The beam 31 is then compressed into a line again so that it may be coded by one-dimensional SLM 40. The signal $f_1(t)$ is applied to one-dimensional SLM 40 with the x axis of one-dimensional SLM 40 corresponding to the t variable.

After passing through one-dimensional SLM 40 light beam 31 expands until it strikes spherical Fourier Transform lens 41. The Fourier Transform of the signal coded in light beam 31 prior to spherical lens 41 is performed and appears in the Fourier Transform plane 42. Because the Fourier Transform of the signal impinging upon spherical lens 41 is the ambiguity function arising from signals $f_1(t)$ and $f_2(t)$, plane 42 is the ambiguity plane and means for detecting the light intensity distribution is placed in ambiguity plane 42.

THE INVENTION

In order to present the invention accurately the following analysis is given. As has been pointed out in FIG. 1 the telecentric spherical lens pair 36 and 39 forms the image of Bragg cell I and $f_2(t)$ onto Bragg cell II and $f_1(t)$ through a linear phase shifter in the Fourier plane. The presence of the linear phase shifter causes a position shift of the image, and this misregistration accomplishes the $\tau$-shift. By spatially varying the slope of the linear phase shifter along the vertical direction, the system spatially scans continuously in the $\tau$ axis. Lens 41 performs a spatial integration to yield the desired ambiguity function.

The Bragg cells accept temporal signals $f_2(t)$ and $f_1(t)$ and convert them into a running transmissivity function $f_2(t-x/v)$. At an instant in time we can consider them as the spatial transmissivity function B1 and B2 with an appropriate scaling factor.

$$B1 = f_2(x) \tag{4}$$

$$B2 = f_1(x) \tag{5}$$

The linear phase shifter 37 is placed in the Fourier plane to shift the phase according to $\phi = 2\pi \xi \eta$ where $\xi$ and $\eta$ are the coordinates in the Fourier plane. Thus the transmissivity function of this linear phase shifter (LPS) is $$LPS = e^{j2\pi\xi\eta}. \tag{6}$$

The process of this cascade optical system can be explained effectively using mathematical manipulations to show how this system generates the ambiguity function in the final plane. The optical fields are notated by $U_0$, $U_1$, ... corresponding to plane 0, plane 1, ... The superscript $-$ and $+$ indicate the field immediately before and after the device.

First, $U_0^-$ can be approximated by a horizontal line, $$U_0^- = \delta(y) \tag{7}$$

The first Bragg cell 35 modulates this line into $$U_0^+ = f_2(x) U_0^- = f_2(x) \delta(y) \tag{8}$$

Lens 36 takes the Fourier transform of this field to give $$U_1^- = \int\int U_0^+ e^{-j2\pi(\xi x + \eta y)} dx\, dy = F_2(\xi). \tag{9}$$

This goes through the linear phase shifter 37 to become $$U_1^+ = e^{j2\pi\xi\eta} U_1^- = F_2(\xi) e^{j2\pi\xi\eta} \tag{10}$$

Lens 39 takes the Fourier transform to give $$U_2^- = \int\int U_1^+ e^{-j2\pi(\xi x + \eta y)} d\xi\, d\eta \tag{11}$$
$$= \int F_2(\xi) \left[\int e^{j2\pi\xi\eta} e^{-j2\pi\eta y} d\eta\right] e^{-j2\pi\xi x} d\xi$$
$$= \int F_2(\xi) \delta(\xi - y) e^{-j2\pi\xi x} d\xi.$$
$$U_2^- = F_2(y) e^{-j2\pi xy}.$$

Equation (11) indicates that the height of the pattern is the bandwidth of the signal $f_1(x)$. If the height of the Bragg cell's effective window is larger than the bandwidth, there is no loss of information due to the narrowness of the Bragg cell window.

$$U_2^+ = f_1(x) U_2^- = f_1(x) F_2(y) e^{-j2\pi xy} \tag{12}$$

Lens 41 takes the Fourier transform of this field and displays it in the plane 3

$$U_3 = \int\int U_2^+ e^{-j2\pi(\xi x - \eta y)} dx\, dy. \tag{13}$$
$$= \int f_1(x) \left[\int F_2(y) e^{-j2\pi xy} e^{j2\pi\eta y} dy\right] e^{-j2\pi\xi x} dx.$$
$$U_3 = \int f_1(x) f_2(x - \eta) e^{-j2\pi\xi x} dx.$$

Equation (13) clearly shows that the ambiguity function defined by equation (1) is achieved in the spatial frequency space $(\xi, \eta)$. The conjugation of signal f (x) can be obtained by putting the signal on a carrier and evaluating the first diffraction order with the aid of a vertical slit in plane 1. The mathematics manipulated in equation (4) through equation (13) are essentially the same to achieve $$U_3 = \int f_1(x) f_2^*(x-\eta) e^{-j2\pi\xi x} dx. \quad (14)$$

It is clear that equation (14) is a spatial representation of the desired ambiguity function, and we can obtain equation (1) by converting the spatial variables into the temporal variables with the appropriate conversion factors.

The manufacturability of the linear phase shifter element 37 is not easy and limits the feasibility of implementing the linear phase shifter approach.

It is essentially an optical wedge whose wedge angle linearly changes with height. The complex transmissivity function of this components in rectangular coordinates is given by $$g(x,y) = e^{j\alpha xy} \quad (15)$$

where $\alpha$ is a constant.

I have invented improved optics for the linear phase shifter in which it is fabricated out of more conventional optics.

By modifying equation (15), we have $$g(x,y) = e^{j\alpha/2\,(x+y)^2} e^{-j\alpha/2\,(x^2+y^2)}. \quad (16)$$

Figure 3:
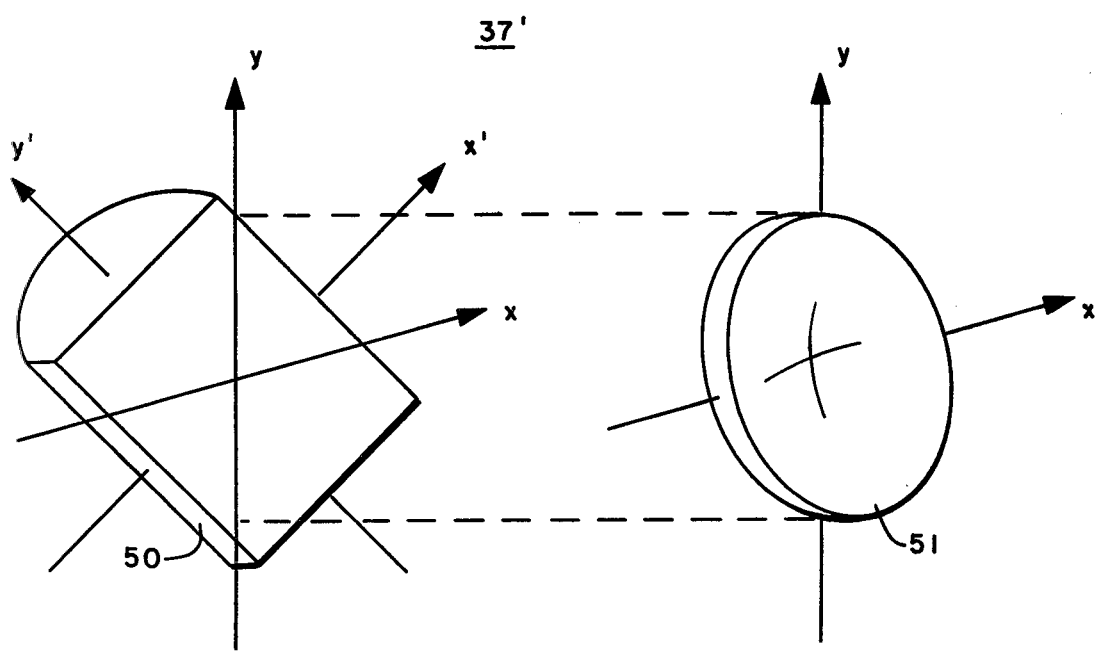

Define $r = x^2 + y^2$ and introduce a coordinate system (x', y') that is rotated from (x,y) by 45° (FIG. 3). Then equation (16) can be rewritten as $$g(x,y) = e^{j\alpha x'^2} e^{-j\alpha/2\,r^2}. \quad (17)$$

The first exponent in equation (17) is the complex transmissivity function of a cylindrical lens oriented parallel to the x' axis. The second exponent is a spherical lens. The cylindrical lens is twice as powerful as the spherical lens, and the sign is opposite.

Therefore, the space variant linear phase shifter can be accurately fabricated by cementing a cylindrical lens and a spherical lens of opposite power together, and orienting them at 45°. The focal length of the cylindrical lens should be half that of the spherical lens.

Referring specifically to FIG. 3, the improved linear phase shifter 37' of this invention is shown wherein a combination of conventional optics is used. A cylindrical lens 50 has the power orientation parallel to the x' axis. The factor $e^{j\alpha x'^2}$ is the complex transmissivity function of this cylindrical lens. A spherical lens 51, of opposite sign as lens 50, is represented by the factor $e^{-j\alpha r^2/2}$ in the equation 17.

In one specific successful experimental embodiment the linear phase shifter element 37' was constructed from off-the-shelf components consisting of a 250 mm single element cylindrical lens 50, and a 505 mm single element negative spherical lens 51. The focal length of the cylindrical lens 50 is one-half that of the spherical lens 51. In the overall system structure using element 37' in place of element 37 and cooperating with the improved phase shifter element 37' in the optical system of FIG. 1 was a cylindrical lens 34 having 800 mm focal length and telecentric imaging lenses 36 and 39 of 762 mm in focal length. The lenses 33 and 41 were of 360 mm focal length.

The embodiments of the invention in which an exclusive property or right is claimed are defined as follows:

1. An optical system utilizing a beam of substantially coherent light to create the ambiguity function arising from a first signal and a second signal; said system comprising:
   a first data input means for coding said light beam with said first signal, said first means defining an x, y coordinate system;
   a first Fourier Transform lens means lying in the path of said light beam and a Fourier Transform plane associated with said first Fourier Transform lens means;
   a linear phase shifter comprising a lens pair including a cylindrical lens and a spherical lens fastened together, the spherical lens having a sign opposite from that of the cylindrical lens and said lens pair lying in the path of said light beam in said Fourier Transform plane and wherein, in order to generate the proper transmissivity function, the lens pair is rotated about the optical axis by 45° with respect to the x, y coordinate system;
   a second data input means for coding said light beam with said second signal; and,
   a final Fourier Transform lens means lying in the path of said light beam for producing the ambiguity function at an ambiguity plane.

2. The optical system according to claim 1 wherein said cylindrical lens has a transmissivity function $e^{j\alpha x'^2}$ and said spherical lens has a transmissivity function $e^{-j\alpha/2 r^2}$.

3. The optical system according to claim 1 wherein the focal length of the cylindrical lens is one-half that of the spherical lens.

* * * * *